United States Patent [19]

Bäumer et al.

[11] Patent Number: 4,499,862

[45] Date of Patent: Feb. 19, 1985

[54] INJECTION DEVICE FOR DIRECT INJECTION DIESEL ENGINES USING ALCOHOL AND DIESEL FUEL

[75] Inventors: Klaus Bäumer, Bonn; Herbert Wiegand, Cologne, both of Fed. Rep. of Germany

[73] Assignee: Deutsche Forschungs- und Versuchsanstalt fur Luft- und Raumfahrt e.V., Cologne, Fed. Rep. of Germany

[21] Appl. No.: 551,265

[22] Filed: Nov. 14, 1983

[30] Foreign Application Priority Data

Nov. 23, 1982 [DE] Fed. Rep. of Germany ....... 3243176

[51] Int. Cl.³ ........................ F02B 75/12; F02B 23/06
[52] U.S. Cl. .................................. 123/1 A; 123/299; 123/304; 123/305; 123/576; 239/533.12
[58] Field of Search ............... 123/1 A, 276, 299, 300, 123/304, 576, 578; 239/533.2–533.12, 66

[56] References Cited

U.S. PATENT DOCUMENTS

| 4,370,958 | 2/1983 | Pischinger ........................ 123/276 |
| 4,399,786 | 8/1983 | Holmer ............................ 123/276 |
| 4,401,071 | 8/1983 | Zürner ............................. 123/276 |

FOREIGN PATENT DOCUMENTS

| 2325822 | 12/1973 | Fed. Rep. of Germany ... 239/533.5 |
| 1209212 | 2/1960 | France ............................ 239/533.3 |
| 535151 | 3/1941 | United Kingdom ................. 123/299 |
| 537825 | 7/1941 | United Kingdom ............. 239/533.3 |
| 549419 | 11/1942 | United Kingdom ............. 239/533.5 |

Primary Examiner—E. Rollins Cross
Attorney, Agent, or Firm—Spensley, Horn, Jubas & Lubitz

[57] ABSTRACT

The injection device has a nozzle body (10) wherein the liquid-controlled needle valves (17; 18) are opened by the diesel fuel supplied by an injection pump via the annular line (12) and the pressure channels (13; 14) when the opening pressure $p_o$, which is set at the pressure springs (19; 20) by way of the pressure adjusting discs (21; 22), is reached. In this connection the two needle valves (17; 18) can be opened and closed at different times within certain limits so that at a relatively low opening pressure $p_o$ for the needle valve (17) relative to the needle valve (18) the diesel fuel issuing through the spray aperture (24) into the combustion chamber (25) serves during the entire injection period as ignition jet for the alcohol fuel issuing from one or more spray apertures (29). The alcohol fuel, which is supplied continuously by a gear pump, flows from the pressure channel (26) to the collecting chamber (27) from where, interrupted by the liquid-controlled needle valve (18), it is injected intermittently via the blind hole (28) and the spray aperture(s) (29) into the combustion chamber (25). Due to the intake of air in the narrowest cross section of the spray apertures (24; 29), diesel and alcohol fuel arrive at the combustion chamber (15) already as two-phase mixture.

12 Claims, 4 Drawing Figures

INJECTION DEVICE FOR DIRECT INJECTION DIESEL ENGINES USING ALCOHOL AND DIESEL FUEL

BACKGROUND OF THE INVENTION

1. Field of the Invention

The invention relates to an injection device for alternative alcohol fuels (ethanol, methanol), more particularly for direct injection diesel engines, in order to be able to process alcohol fuels, which do not have good spontaneous ignition qualities, in engines without spark ignition.

2. Description of the Prior Art

When using alternative alcohol fuels for direct injection diesel engines, it is necessary to increase the temperature in the combustion chamber of a direct injection diesel engine with a fuel (diesel fuel) which has good spontaneous ignition qualities during the ignition phase of the alcohol fuel, which does not have good spontaneous ignition qualities, to such a degree that its spontaneous ignition temperature is reached.

It is known that in order to process alcohol fuels, which do not have good spontaneous ignition qualities, in engines without spark ignition, particular measures are necessary. This can be achieved, on the one hand, by adding an ignition accelerator, for example kerobrisol or amyl nitrate, in order to redue the temperature necessary for spontaneous ignition. On the other hand, this can be achieved through measures on the engine, namely by increasing the temperature level towards the end of the compression stroke until it is above the spontaneous ignition temperature.

It emerges from the polytropic curve equation for the temperature increase during compression that the temperature of the charge at the end of the compression stroke is dependent essentially on the temperature when the inlet valve closes and on the height of the compression ratio. In addition to the increase in the compression ratio, therefore, the increase in the intake air temperature is important. The latter can be effected either by heating the intake air or by mixing the same with hot exhaust gases which can be taken either from a separate burner or simply from the exhaust line of the engine. With the majority of diesel engines, owing to the long ignition lag, there will be at the moment of ignition already a relatively large amount of ignitable mixture, which results in sudden combustion with every negative effect on the drive equipment and on noise dissipation. MAN's M process avoids this problem with the aid of the wall addition of the fuel, thereby ensuring that once combustion commences only small amounts of fuel are prepared, and that further combustion proceeds in a controlled manner with the aid of the angular momentum of air. At any rate, it has been shown in this connection that starting and running in pure alcohol operation could be effected only with the aid of a starting aid, for example on the basis of a starting pilot arrangement. If, before the engine is switched off, there is a change-over to diesel fuel, then the later start can take place during pure diesel operation. The injection equipment differs from the conventional multifuel engine by a pump element which is enlarged on account of the relatively low calorific value.

The intake pipe injection of methanol, the diesel fuel-methanol-emulsion method and the direct injection of methanol have been examined as further mixture formation methods for running direct injection diesel engines with alcohol fuels. In the case of intake pipe injection, methanol is added to the air admitted in the intake pipe. Ignition is taken over by the conventionally injected diesel fuel. On the basis of various problems—for example, in the partial load range this process results in spark failures so that the proportion of methanol in this operating range must be greatly reduced—any substitution of diesel fuel by methanol with the aid of intake pipe injection in accordance with the present state of development is possible only to a limited extent. Similar problems also arose with the emulsion methods wherein a mixture of diesel fuel and methanol was used in place of diesel fuel. As, at present, a method of producing a stable mixture between diesel fuel and methanol is still not known, an emulsion must be produced in the fuel system by constant, intensive, mechanical mixing. Due to the great vaporization heat, the emulsified methanol has a disadvantageous effect on the ignition lag of the diesel fuel, and increased HC and CO emissions result in the partial load range, and spark failures may even occur.

The direct injection of methanol in conjunction with a diesel fuel injection jet, the so-called ignition jet process, provides better possibilities here. Tests with direct injection of methanol were carried out for two different direct injection processes. These are combustions processes, which are known in practice, having the designations D and Z. The mixture formation is assisted in both combustion processes by a swirl of air produced in the intake channel. The D process works with injection, close to the wall, into a deep trough; a heavy stratification of charge in the form of a ring of mixture is produced in conjunction with a great angular momentum of air. In dual-fuel operation, the methanol is injected close to the wall with the two-hole nozzle conventional for pure diesel operation. In order to start combustion, a diesel fuel ignition jet is introduced into the combustion chamber by means of an additional one-hole nozzle. The direction of the ignition jet is chosen so that the diesel fuel ignition jet serves over the entire speed range as reliable igniter for the methanol air mixture. In the case of the Z process, the fuel is sprayed in standard diesel operation through a centrally arranged four-hole nozzle in a spacially distributed manner into an open, flat combustion chamber trough. In dual-fuel operation with methanol, reliable ignition is achieved with the aid of a diesel fuel injection nozzle which sprays diagonally through the combustion chamber and which has a relatively great free jet length.

SUMMARY OF THE INVENTION

The object underlying the invention is in the case of direct injection diesel engines for alcohol fuels to inject the diesel fuel, which has good ignition qualities, and the alcohol fuel, which does not have good ignition qualities, into the combustion chamber with the aid of an injection device in such a way that through the diesel fuel, which has good ignition qualities and of which the start of injection must come chronologically before the start of injection for the alcohol fuel, the temperature level in the combustion chamber is increased towards the end of the compression stroke until it is above the spontaneous ignition temperature of the alcohol fuel and/or with the aid of the diesel fuel the start of combustion and reliable ignition over the entire operating range of the engine is achieved.

This object is achieved according to the invention in that in the diesel and alcohol fuel dual-fuel system the alcohol fuel is fed continuously, for example with the aid of a gear pump; the diesel fuel is fed intermittently with an injection pump of known construction, via separate pressure lines to the injection device. Opening and closing of the spray apertures for the diesel and alcohol fuel is carried out by the diesel fuel which is supplied by the injection pump, in each case by way of a liquid-controlled needle valve of known construction. Through the valve needle, which is pressed with great, adjustable initial stress onto the valve seat, the opening pressure $p_o$ can be prescribed in such a way that within determined limits chronologically different opening and closing times for the two liquid-controlled needle valves can be set. If necessary, and if it is desired for the running of a direct injection diesel engine, the diesel fuel can also be fed continuously with a gear pump, and the alcohol fuel can be fed intermittently with an injection pump of known construction, to the injection device so that both needle valves are controlled by way of the alcohol fuel.

Figure 1:
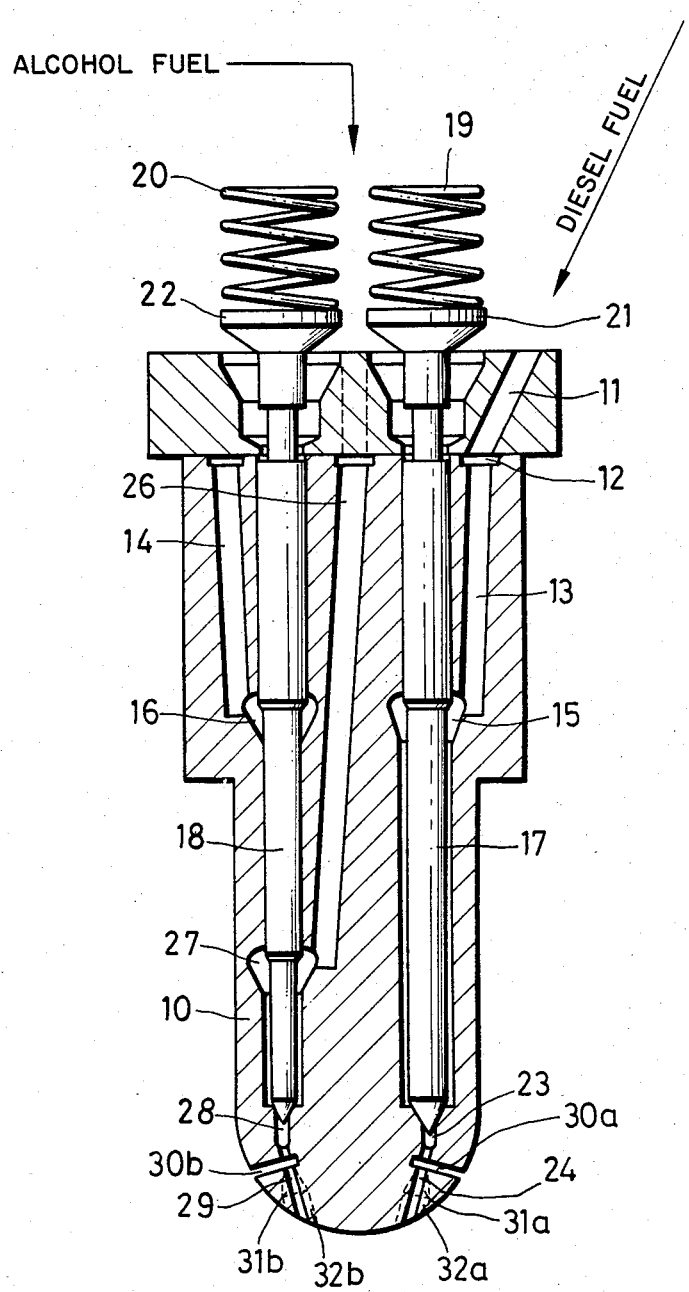
FIG. 1 is a view of a nozzle body made according to the present invention.

An exemplary embodiment of the invention is represented in the drawings and is described in greater detail in the following.

FIG. 1 shows a nozzle body 10 with a pressure channel 11 for diesel fuel, which carries via an annular channel 12 the diesel fuel via the pressure channels 13 and 14 to the pressure chambers 15 and 16 so that when the opening pressure $p_o$, which can be set for the liquid-controlled needle valves 17 and 18 separately from each other at the pressure springs 19 and 20 by way of the pressure adjusting discs 21 and 22, is reached, the needle valve 17 and the needle valve 18 can be controlled within certain limits chronologically independently from each other. The pressure channel 13 for the diesel fuel leads on from the pressure chamber 15 as far as the blind hole 23, from where, with open needle valve 17, the diesel fuel can enter the combustion chamber 25 through the spray aperture 24. The pressure channel 14 ends in the pressure chamber 16 so that the liquid entering this pressure channel serves only to control the needle valve 18. The second fuel component—in the case described here alcohol fuel—flows through the pressure channel 26 via the collecting chamber 27 to the blind hole 28 from where, with open needle valve 18, the alcohol fuel can enter the combustion chamber 25 via the spray aperture 29. The fit of the needle valve 18 in the nozzle body 10 between the pressure chamber 16 and the collecting chamber 27 corresponds to the usual fit for liquid-controlled needle valves. As, according to the invention, at the needle valve 18 the pressure of the control liquid is greater than the pressure of the liquid to be injected, the direction of flow of the liquid leakage goes from the pressure chamber 16 to the collecting chamber 27. Through the inlet port 30a; 30b, in the narrowest cross section of the spray apertures 24 and 29 air is taken in from the combustion chamber 25 so that with diesel and alcohol fuel there are produced two-phase flows which enter the combustion chamber 25 by way of the spray apertures 24 and 29. In order to achieve optimum flow conditions in the spray apertures 24 and 29, a diffuser-like enlargement 31a; 31b with cylindrical portion 32a; 32b can be connected thereafter.

Figure 2:
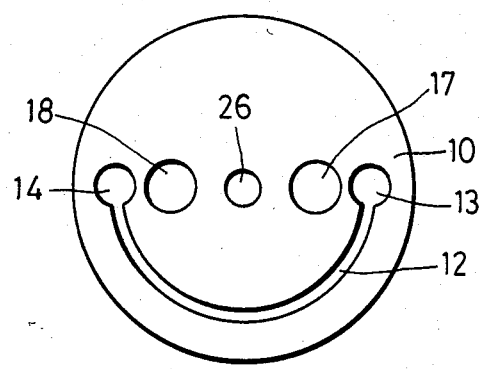
FIG. 2 is a view of the arrangement of channels in the nozzle body of FIG. 1.

FIG. 2 shows the arrangement of the annular channel 12 in the nozzle body 10 with the pressure channels 13 and 14 for the diesel fuel and with the pressure channel 26 for the alcohol fuel with the liquid-controlled needle valves 17 and 18.

Figure 3A:
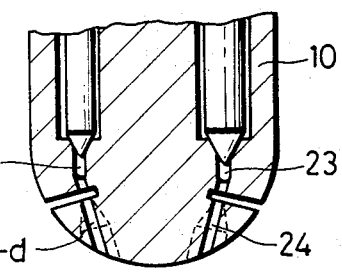
FIG. 3A shows a possible injection arrangement for the Z process.
Figure 3B:
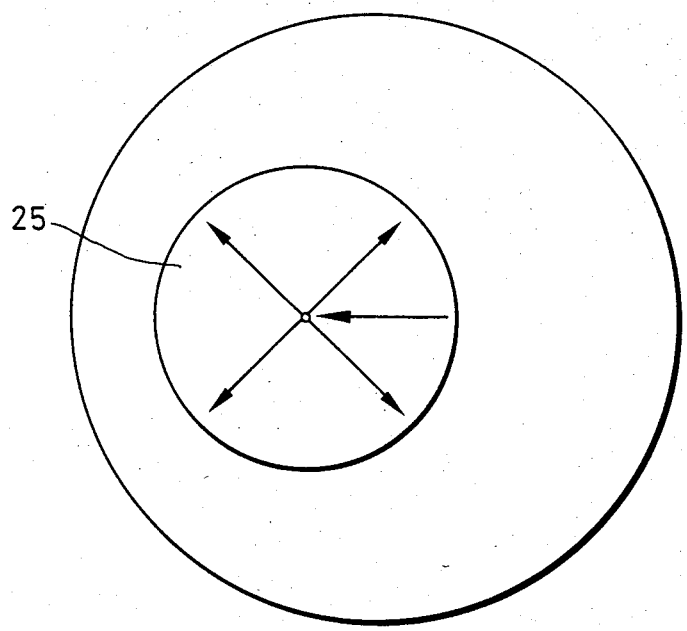
FIG. 3B illustrates the diagonal injection of diesel fuel into the combustion chamber for the arrangement of FIG. 3A.

FIG. 3 shows a possible injection arrangement for the Z process. Here, diesel fuel issuing from the blind hole 23 is injected via a spray aperture 24 diagonally into the combustion chamber 25 so that it serves as igniter for the alcohol fuel which reaches the combustion chamber 25 via the blind hole 28 through 4 injection bores 29a–29d.

The advantages obtained with the invention consist more particularly in that for direct injection diesel engines with an injection device which is constructed according to the invention as dual-fuel injection nozzle, diesel fuel and alcohol fuel can be injected into a combustion chamber in such a way that the diesel fuel, which has good spontaneous ignition qualities, serves during the entire injection period as ignition aid for the alcohol fuel, which does not have good spontaneous ignition qualities. In dual-fuel operation, the alcohol fuel is injected towards the end of the compression stroke into the combustion chamber; injection of the diesel fuel begins shortly before, namely in such a way that the opening pressure $p_o$ at the liquid-controlled needle valve 17 for the diesel fuel is set at the pressure adjusting disc 21 at a lower value than at the liquid-controlled needle valve 18 with the pressure adjusting disc 22 for the alcohol fuel.

A further, very essential advantage of the injection device is that for the direct injection of diesel and alcohol fuel, in order to control the two needle valves 17, 18 only one fuel component is necessary, and namely that component which is fed intermittently through an injection pump, so that in order to supply the second fuel component, not a second injection pump, but a gear pump, which is substantially simpler and cheaper in design and operation and which provides a continuous supply, suffices. As both needle valves 17; 18 can be controlled by one and the same injection pump in a control circuit, the different times for the opening and closing of both needle valves 17; 18 can also be set precisely.

Furthermore, with the inlet ports 30a; 30b at the narrowest point of the spray apertures 24; 29, jet hardness and depth of penetration in the injection device according to the invention can be controlled in such a way that a stratification of charge is produced in the combustion chamber.

With the aid of theoretical formulations and of characteristic values, which are to be determined from tests, the injection device for diesel and alcohol fuel according to the invention can be designed in such a way that optimum substitution of diesel fuel by alcohol fuel with favourable ignition conditions for a prescribed combustion chamber size and geometry can be achieved.

Alcohol fuels pose problems for high pressure injection. More particularly the low viscosity results in manifestations of wear at specific highly loaded points.

These problems can be regarded largely as being solved on the pump side with the measures according to the invention, as an injection pump for alcohol fuel can be dispensed with. Likewise, wear problems at specific highly loaded points due to the low viscosity of the alcohol fuels can be avoided as a result of the fact that diesel fuel flowing as oil leakage at these points produces a lubricating effect.

We claim:

1. In an injection device for direct injection diesel engine using an injection ppump, wherein at the end of the compression stroke diesel fuel is injected from a spray aperture and alcohol fuel is injected from one or more spray apertures into the combustion chamber, the improvement comprising:

means for injecting the diesel fuel, which has good ignition qualities, chronologically before and chronologically after the start and end of injection for the alcohol fuel, which does not have good ignition qualities, so that during the entire injection process the diesel fuel is available as an ignition aid for the alcohol fuel.

2. An injection device according to claim 1, wherein said means comprises a liquid controlled needle valve for the diesel fuel and a liquid controlled needle valve for the alcohol fuel, said needle valves being provided with pressure adjusting discs set at different opening pressures.

3. An injection device according to claim 2 wherein in order to control the needle valve for the diesel fuel and the needle valve for the alcohol fuel only one liquid is necessary said one liquid being selected as either the diesel fuel or the alcohol fuel.

4. An injection device according to claim 3 wherein the liquid with which the needle valves are controlled is supplied by said injection pump and the other liquid is supplied at lower pressure.

5. An injection device according to claim 3 further comprising a pressure channel for each needle valve and an annular channel for supplying the liquid to control the needle valves to said pressure channels.

6. An injection device according to claim 3 further comprising a blind hole for the needle valve for alcohol fuel, said needle valve opening into said one or more spray apertures.

7. An injection device according to claim 3 further comprising inlet ports for connecting the spray apertures at their narrowest crosssections with the combustion chamber so that there is a two-phase flow of each liquid into the combustion chamber.

8. An injection device according to claim 1 wherein the spray aperture for the diesel fuel is at an angle to the, or to one of the, spray apertures for the alcohol fuel so that the diesel fuel and alcohol fuel injected into in the combustion chamber encounter each other in such a way that the diesel fuel acts as an ignition jet.

9. An injection device according to claim 4 wherein said liquid selected is diesel fuel and further comprising a pressure chamber for diesel fuel adjacent said needle valve for alcohol fuel and a collecting chamber for alcohol fuel adjacent said needle valve for alcohol fuel, so that diesel fuel flows as oil leakage from the pressure chamber to the collecting chamber whereby the needle valve experiences a lubricating effect by the diesel fuel.

10. In a nozzle for injecting fuel into the combustion chamber of a direct injection diesel engine which uses both alcohol and diesel fuel, and to which nozzle diesel fuel is supplied at high pressure by an injection pump, the improvement comprising:

a first needle valve for diesel fuel; and a second needle valve for alcohol fuel, the opening and closing of said first and second needle valves controlled so that said second needle valve opens after said first needle valve opens and closes before said first needle valve closes.

11. A nozzle as in claim 10 wherein said first and second needle valves are controlled by diesel fuel from said injection pump.

12. A nozzle as in claim 11 further comprising a first spray aperture through which diesel fuel is injected into said combustion chamber and a second spray aperture through which alcohol fuel is injected into said combustion chambers, said first and second spray apertures angled toward one another so that diesel fuel injected into said combustion chamber serve as an igniter for alcohol fuel injected into said combustion chamber.

* * * * *